April 29, 1952 H. E. FRITZ 2,595,069
ROTARY CYCLIC STRESS TESTING APPARATUS
Filed May 22, 1948
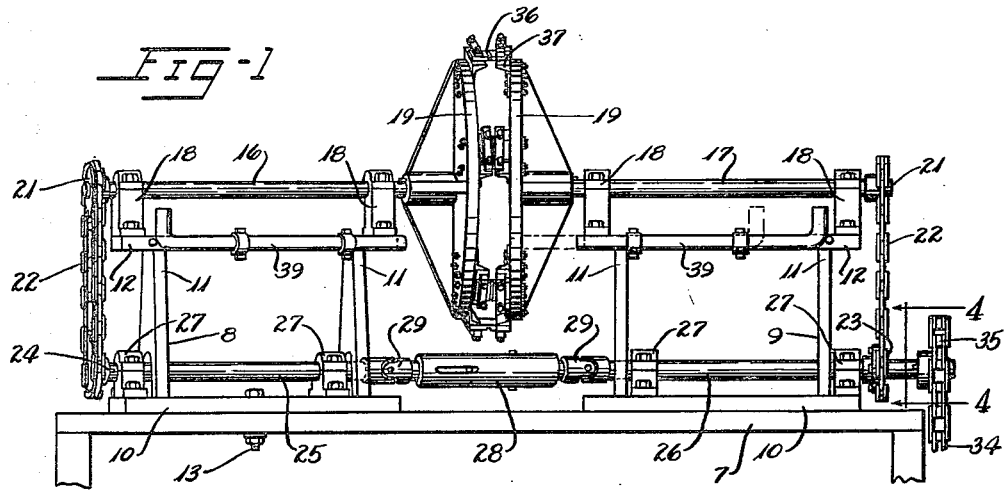
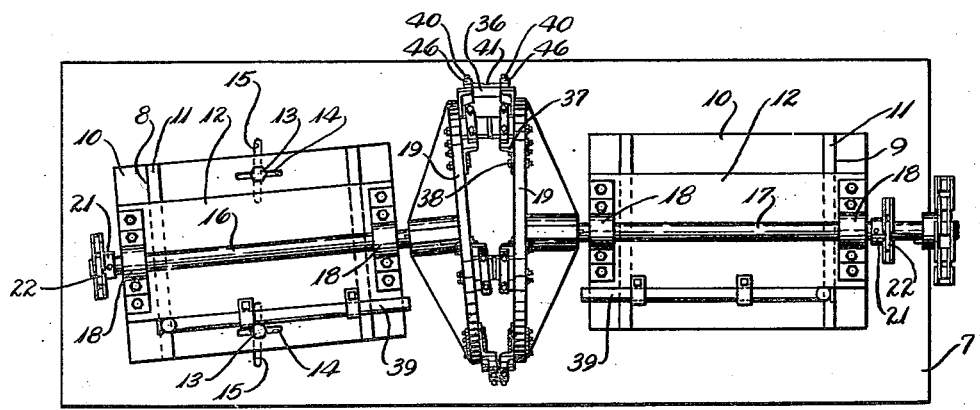
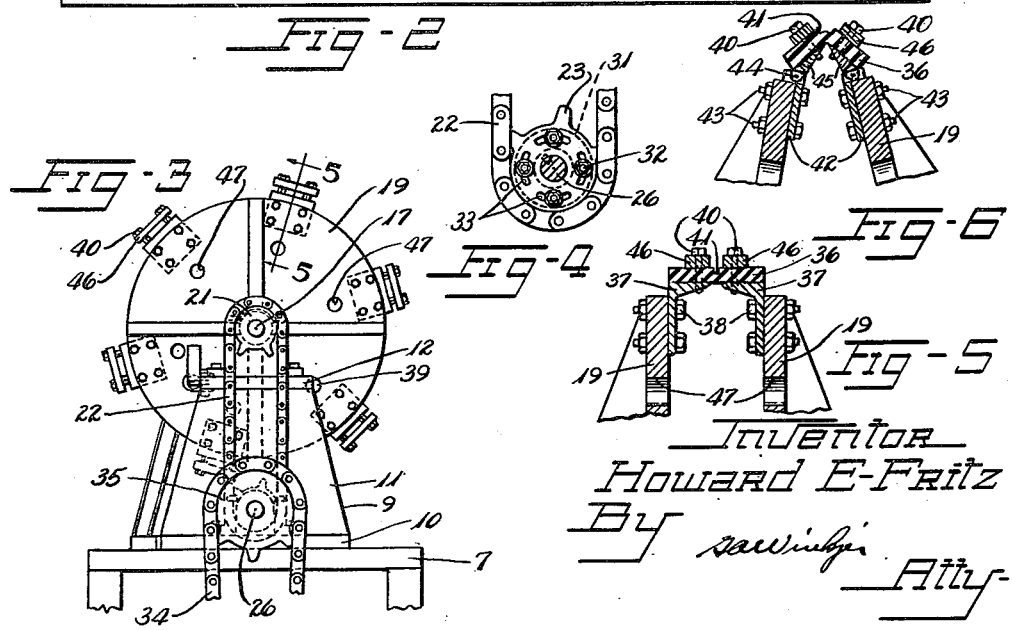
Inventor
Howard E. Fritz
By
Atty Patented Apr. 29, 1952

2,595,069

UNITED STATES PATENT OFFICE 2,595,069

ROTARY CYCLIC STRESS TESTING APPARATUS

Howard E. Fritz, Ghent, Ohio, assignor to The B. F. Goodrich Company, New York, N. Y., a corporation of New York Application May 22, 1948, Serial No. 28,717

8 Claims. (Cl. 73—92)

1

This invention relates to testing apparatus for determining the ability of material such as rubber and other rubber-like materials to resist cyclic flexure and is useful for example in testing the material for its resistance to cracking and for the growth characteristics of cracks that have formed in articles subjected to repeated loads. One of the causes of tire failure is cracking of the material in the grooves of the tread, and it is desirable to have testing apparatus which will simulate the cyclic loading on materials of tire treads to aid in evaluating the effectiveness of the material to resist the cyclic flexing.

Heretofore results which have been obtained with prior testing apparatus, especially with testing machines of the reciprocating type, have sometimes been difficult to correlate with the results obtained under actual road tests. This has been true especially with regard to the problem of crack growth.

It is an object of this invention to provide testing apparatus for subjecting articles to conditions similar to the operating conditions. Other objects are to provide for subjecting articles to cyclic loading, to provide apparatus for obtaining uniformly accurate and reliable test results relative to the stressing of such articles, to provide for testing a multiplicity of articles simultaneously, to provide accessibility of the articles for observing their condition during the test and for mounting and measuring the articles with facility, to provide for imposing compression and tension loads upon the articles during each cycle of the apparatus, to provide for repeated stressing of the articles with a minimum of vibration of the apparatus, to provide for acceleration of the testing procedure, to provide for simplicity of construction and to provide for ease and convenience of operation and maintenance.

These and further objects will be apparent from the following description, reference being had to the accompanying drawings in which:

Fig. 1 is a front elevation of apparatus constructed in accordance with and embodying the invention.

Fig. 2 is a plan view of the apparatus shown in Fig. 1.

Fig. 3 is an end elevation of apparatus shown in Fig. 1.

Fig. 4 is a section taken along the line 4—4 of Fig. 1.

Fig. 5 is a section taken along the line 5—5 of Fig. 3.

Fig. 6 is a section like Fig. 5, but showing a modified clamping arrangement.

2

As shown in the drawings, the apparatus may be mounted on a table 7 and is supported in the desired working position by frames 8 and 9 including base plates 10, 10 and legs 11, 11 supporting cross members 12, 12. At least one of the frames 8 is mounted adjustably on the table 7 by bolts 13, 13 which are disposed in slots 14 and 15 in the frame and table respectively.

Shafts 16 and 17 are mounted rotatably on the frames 8 and 9 and turn in suitable anti-friction bearings which are contained in brackets 18, 18 mounted on the cross members 12, 12. On each shaft 16 and 17 is mounted a radially extending disc-like plate 19 which is disposed at a spaced-apart position from another disc-like plate 19 of the other shaft. Sprockets 21, 21 are mounted on the shafts 16 and 17 which are engageable with chains 22, 22 which may be driven by sprockets 23 and 24 mounted on drive shafts 25 and 26. Drive shafts 25 and 26 are mounted rotatably in suitable anti-friction bearings which are contained in brackets 27, 27 mounted on the base plates 10, 10. The drive shafts 25 and 26 are connected by a slip joint 28 secured to universal joints 29, 29 which are mounted on the shafts 25 and 26. As shown in Fig. 4 one sprocket 23 is mounted adjustably on a flanged collar 31 which is mounted on the shaft 26 by bolts 32, 32 disposed in slots 33, 33 in the sprocket to permit circumferential adjustment of the sprocket relative to the shaft and therefore permit rotative adjustment of the shafts 16 and 17. The drive shafts 25 and 26 may be driven by a chain 34 which is engageable with a sprocket 35 mounted on one of the drive shafts 26, 26 and driven as by a motor (not shown).

The articles to be tested may be in the form of strips 36, 36 as shown in Figs. 2 and 5 and may be secured to the plates 19, 19 as by clamps which are mounted on the plates at spaced-apart positions circumferentially of the plate. Each clamp has an angle member 37 with one face abutting the plate 19 and mounted thereon by bolts 38, 38 and another face disposed for receiving the strip 36. A clamping band member 46 is secured to the angle by bolts 40, 40 for gripping the strip 36 between the band member and the angle face. The strips 36, 36 may be grooved as at 41, to simulate the grooves in tire treads and to locate the position of the crack in the grooves of the strips.

As will be seen in the drawings the article at each position is clamped to the plate 19 in such disposition that all points of the juncture of the article with the clamp are spaced from and on one side of, i. e. wholly within a semi-circumference about, the axis of rotation of the plate so that the article can be subjected to tension or compression stresses without subjecting the article to bending stresses.

The strips 36, 36 are preferably mounted on the plates with the clamps of the two plates opposite one another. Rods 39, 39 are mounted slideably on frames 8 and 9 and may be inserted in apertures 47, 47 in the plates 19, 19 to maintain the plates in the desired relationship during the clamping of the strips 36, 36 by counteracting the spring effect of the strips tending to rotate the plates to the starting position.

In operation, the frames 8 and 9 are adjusted to the position in which the shafts are at the angle desired. This is done by loosening the bolts 13, 13 and moving them in slots 14 and 15 after which the bolts may be tightened to fix the relationship between the frames and shafts. By increasing the angle between the shaft axes the amplitude of stressing movement imposed on the strips 36, 36 may be increased and by diminishing the angle between the axes the amplitude may be decreased. The strips 36, 36 may be compressed or stretched or both during one revolution of the shafts 16 and 17 depending upon the relative position of the clamps 37, 37 when the strips are mounted.

To obtain maximum stretching of the strips 36, 36 with a minimum of compression each strip is mounted in an unstressed condition at positions at which the clamps 37, 37 are closest together. Conversely to obtain the maximum compression with a minimum of stretching the strips 36, 36 are mounted in an unstressed condition at the position at which the clamps 37, 37 are farthest apart. In testing material for tire treads it is desirable to have both compression and tension of the strips 36, 36 and this is simply attained by mounting the strips in the unstressed condition at position of the clamps 37, 37 intermediate the extreme position mentioned heretofore. The rods 39, 39 may be inserted in the plates 19, 19 to hold the plates while the strips 36, 36 are being mounted. The rods also may be used in obtaining circumferential alignment of the plates, which alignment is made possible by loosening the bolts 32, 32 of the sprocket 23 and moving the sprocket relative to the collar 31 until the plates 19, 19 are suitably aligned after which the bolts 32, 32 may be tightened to fix the circumferential relationship between the plates.

After the strips 36, 36 are mounted on the plates 19, 19 and the plates are aligned the shafts 16 and 17 may be rotated by activating the driving chain 34 which drives the drive shafts 25 and 26 and the chains 22, 22. As the shafts 16 and 17 rotate the plates 19, 19 the opposing clamps move toward and away from each other and stress the intervening strips 36, 36. The rotation of the apparatus may be stopped at intervals for examination of the strip. Cracks which appear may be measured and the crack growth determined for several readings.

Referring to Fig. 6 a modified clamp is shown which provides a hinging action and may be used in place of the clamp shown in Fig. 5. One hinge member 42 of the clamp is mounted on the plate 19 as by bolts 43, 43 and is hinged on a pin 44 to a second hinge member 45 disposed for receiving the strip 36. A clamping band 46 is secured to the second hinge member 45 by bolts 47, 47 for gripping the strip therebetween. The hinge clamp may be used to obtain bending alone or bending and stretching of the strip 36 as the plates 19, 19 are rotated and the opposing clamps are moved toward and away from each other. Bending is provided when the strip 36 tends to be compressed and thereby causes the gripping hinge member 45 to swing outwardly as shown in Fig. 6, and when the strip 36 and the gripping pin member 45 are swung back to a position such as shown in Fig. 5.

Variations may be made without departing from the scope of the invention as it is defined in the following claims.

I claim:

1. Apparatus for testing the resistance of a flexible article to cyclic stresses, said apparatus comprising adjacent bodies mounted for rotation about individual axes, one of said axes being inclined to the other, means for supporting the article on the bodies with the juncture of the article and the supporting means at each body wholly spaced from and disposed on one side of the axis of the body for movement with the bodies, and means for rotating said bodies to impose cyclic stresses on said article by virtue of the relative inclination of said bodies providing converging and diverging paths of movement of the portions of said bodies on which the article is supported as the article is moved bodily about the axes of said bodies.

2. Apparatus for testing the resistance of a flexible article to cyclic stresses, said apparatus comprising adjacent bodies having ends in opposition to each other and said bodies being mounted for rotation about individual axes inclined one toward the other, means for supporting the article mounted on each of said bodies at each end with the juncture of the article and the supporting means wholly spaced from and disposed on one side of the axis of the body for movement with the end and means for rotating said bodies to impose cyclic stresses on said article by virtue of the relative inclination of said bodies providing converging and diverging paths of movement of the portions of said ends on which the article is supported as the article is moved bodily about the axes of said bodies.

3. Apparatus for testing the resistance of flexible articles to cyclic stresses, said apparatus comprising shafts mounted for rotation about axes inclined one to the other, end structures mounted on said shafts, mounting stations disposed at circumferentially spaced positions on said end structures about the axis thereof and clamping means at each of said stations for supporting the articles between said end structures for movement with said structures and means for rotating said shafts to impose cyclic stresses on said articles by virtue of relative inclination of said shafts as the articles are moved bodily about the axes of said shafts.

4. Apparatus for testing the resistance of flexible articles to cyclic stresses, said apparatus comprising shafts mounted for rotation about axes inclined one to the other, disc-like plates mounted on said shafts, mounting stations disposed at circumferentially spaced positions about the axes thereof at the outer periphery of said disc-like plates and clamping means at each of said stations for supporting the articles between said disc-like plates for movement therewith and means for rotating said shafts to impose cyclic stresses on said articles by virtue of the relative inclination of said shafts as the articles are moved bodily about the axes of said shafts.

5. Apparatus for testing the resistance of a flexible article to cyclic stresses, said apparatus comprising adjacent bodies mounted for rotation non-coaxially, means for supporting the article on each body with the juncture of the article and the supporting means wholly spaced from and disposed on one side of the axis of the body for movement with the body, said bodies having a connection providing for simultaneous rotation of said bodies, said connection being adjustable for changing the relative circumferential positions of said bodies and means for rotating said bodies to impose cyclic stresses on said article by virtue of the non-coaxial movement of said bodies providing converging and diverging paths of movement of the portions of said body on which the article is supported as the article is moved bodily about the axes of said bodies.

6. Apparatus for testing the resistance of flexible articles to cyclic stresses, said apparatus comprising a supporting structure, shafts mounted rotatably on said structure about axes inclined one to the other, disc-like plates mounted on said shafts in opposition to each other, mounting stations disposed at circumferentially-spaced positions on said plates about the axis thereof, clamping means at said stations for supporting the articles between said plates for movement with said plates, means for releasably fixing said plates to said structure to facilitate mounting of said articles and means for rotating said shafts relative to said structure to impose cyclic stresses on said articles by virtue of the relative inclination of said shafts as the articles are moved bodily about the axes of said shafts.

7. Apparatus for testing the resistance of flexible articles to cyclic stresses, said apparatus comprising bodies mounted for rotation about axes inclined one to the other, means for supporting the articles between said bodies at circumferentially spaced positions on each of said bodies about the axis thereof for movement of the articles with said bodies and means for rotating said bodies to impose cyclic stresses on said articles by virtue of the converging and diverging paths of movement of the portions of said bodies on which the articles are supported as the bodies are rotated about their inclined axes.

8. Apparatus for testing the resistance of flexible articles to cyclic stresses, said apparatus comprising a supporting structure, bodies mounted rotatably on said structure about axes inclined one to the other, means for detachably mounting the articles on each body at circumferentially spaced positions about the axis of the body for supporting the articles between the bodies for movement with said bodies, means for releasably holding said bodies against rotation to facilitate mounting of the articles, means for adjustably changing the inclination of one of said bodies relative to the other, said bodies having a connection one with the other providing for simultaneous rotation of the bodies, said connection comprising adjustable means for changing the relative circumferential position of said bodies and means for accommodating changes in the inclination of the axes of said bodies, and means for rotating said bodies to impose cyclic stresses on the articles by virtue of the converging and diverging paths of movement of the portions of said bodies on which the articles are supported as the bodies are rotated about their inclined axes.

HOWARD E. FRITZ.

REFERENCES CITED

The following references are of record in the file of this patent:

UNITED STATES PATENTS

| Number | Name | Date |
| --- | --- | --- |
| 1,559,466 | Schopper | Oct. 27, 1925 |
| 1,595,318 | Shields | Aug. 10, 1926 |
| 2,007,286 | Schopper | July 9, 1935 |
| 2,235,622 | Ray | Mar. 18, 1941 |

FOREIGN PATENTS

| Number | Country | Date |
| --- | --- | --- |
| 501,983 | Germany | July 9, 1930 |